United States Patent [19]

Verboom et al.

[11] Patent Number: 4,606,016
[45] Date of Patent: Aug. 12, 1986

[54] WRITE PROTECTION AND DATA DETECTION USING DIFFERENTIAL DETECTOR

[75] Inventors: Johannes J. Verboom; Roger R. Bracht, both of Colorado Springs, Colo.

[73] Assignee: Optical Storage International, N.Y.

[21] Appl. No.: 578,152

[22] Filed: Feb. 8, 1984

[51] Int. Cl.⁴ .......................... G11B 3/90; G11B 27/36
[52] U.S. Cl. ......................................... 369/54; 369/58
[58] Field of Search .............................. 369/54, 58, 59

[56] References Cited

U.S. PATENT DOCUMENTS 4,546,462 10/1985 Koishi et al. ........................ 369/59

Primary Examiner—Vincent P. Canney
Attorney, Agent, or Firm—E. P. Heller, III; J. A. Genovese

[57] ABSTRACT

Disclosed is an apparatus for detection of write protect data written on an optical disk by simultaneously reading the data during writing using differential detection and disabling further writing if write protect data is present. The write protect data is the same format as other data written on the optical disk and is written as the first byte of data on all data fields. The data is written in a fixed-block format defining a symbol having a predetermined number of symbol positions and a predetermined number of holes which may be written at the symbol positions, an equal number of holes at odd and at even positions. The write protect symbol has holes written at symbol position numbers two and five. During the writing of a write protect symbol, the laser is operated at read power before it is operated at write power and a signal associated with the hole associated power of the reflected beam is sampled at position number eight of the previous symbol and at position number one of the write protect symbol. The hole associated power at position number one will be significant if a hole was previously written at position number two. The read signals at positions one and eight are compared to each other. If the position number one signal exceeds that at number eight by a predetermined differential, a hole was previously recorded at position number two, indicating the presence of a previously written write protect byte of data.

The same apparatus is also used to detect the presence of or absence of data in a data sector during read mode.

7 Claims, 8 Drawing Figures

WRITE PROTECTION AND DATA DETECTION USING DIFFERENTIAL DETECTOR

BACKGROUND OF THE INVENTION

1. Field of the Invention

The invention relates to the field of optical disk recorders and, more particularly, to means for detecting the presence of prerecorded data during writing of data on the optical disk.

2. Brief Description of the Prior Art

Most recording systems attempting to protect previously written data do so by building an index of the data written on the disk descriptive of the location and extent of the data. If the index failed, previously written data could be overwritten. However, the new data was usually correctly recorded and could be read.

In optical recording, it is not currently possible to write new data in disk areas having previously recorded data. A failure in the index leads to loss of both the old data and the new data. Reliance on an index only is not entirely satisfactory.

While it is possible to first read each and every data sector before writing data into the sector, unless an additional read head is employed, at least one extra disk revolution is lost reading a sector before writing in it can commence.

SUMMARY OF THE INVENTION

The invention directly protects previously written data by writing a write protect byte of data at the head of each data block and using differential detection to "read" the write protect data byte during the writing of every new write protect data byte and, by analysis of the signals so read, determining whether a write protect data byte has been previously recorded.

The preferred embodiment is intended for those optical recording systems recording data in a fixed-block code such as the TOON code where only two out of the nine positions may have holes with one hole in an odd position and one hole in an even position. The write verify apparatus for such a code employs apparatus which samples reflected signals immediately after the center of each position of the symbol, after the point at which the write beam employed in writing a hole on the disk has been restored to read power. Two sample and holds are employed for the odd numbered symbol positions and two for the even numbered positions The signal from the ninth position, in which the code is constrained to never have a hole recorded, is used as a reference for both the even and odd positions.

For the write verify function, the hole associated power of the reflected read laser beam at each of the odd positions is compared first to the reference and then to the previous highest sampled value. The same is done for the even positions. Using this method, the location of the two positions having the highest hole associated signal values are determined. The results of the comparison are compared to the actual location of the write pulse and the results of this comparison are used to indicate or verify that the holes have been written in their proper positions.

For the write protect function, the sample and hold containing the signal value received from the first even or odd symbol position of the write protect symbol is compared to the reference value in the sample and hold triggered at the ninth position of the "previous" symbol. The write protect data byte has a hole recorded in either the first odd or the second even numbered position, respectively. If a hole has been previously recorded at either of these positions, the hole associated power of the reflected beam is present to a significant extent at the previous position, the position at which the even or odd sample and hold cell is triggered. The presence of this hole can be detected by comparing this sample and hold value with the reference. If the former exceeds the latter by a predetermined differential, a hole is present, and write protect data has previously been recorded.

DESCRIPTION OF THE PREFERRED EMBODIMENT

An optical recorder reading the information from the optical disk does so conventionally by means of a laser operated at read power. The beam reflects from the disk, and the drop in reflection normally indicates the presence of a hole. Because reflected spot density distributions have a Gaussian shape, the hole associated power of the reflected beam (the hole associated power means the inverse of the reflected power from the disk) spreads a significant distance beyond the boundaries of the holes themselves. Indeed, the hole power present at the center of adjacent positions in closely spaced systems may be significant. This property of the read signal may be advantageously employed to verify that data has not been previously recorded on the disk during the writing of the first symbol of data in a block of data.

In the preferred embodiment, the write protect apparatus employs much of the apparatus used in read and write verify functions. It is essential therefore to understand how the apparatus of the preferred embodiment functions in that mode of operation.

Figure 1:
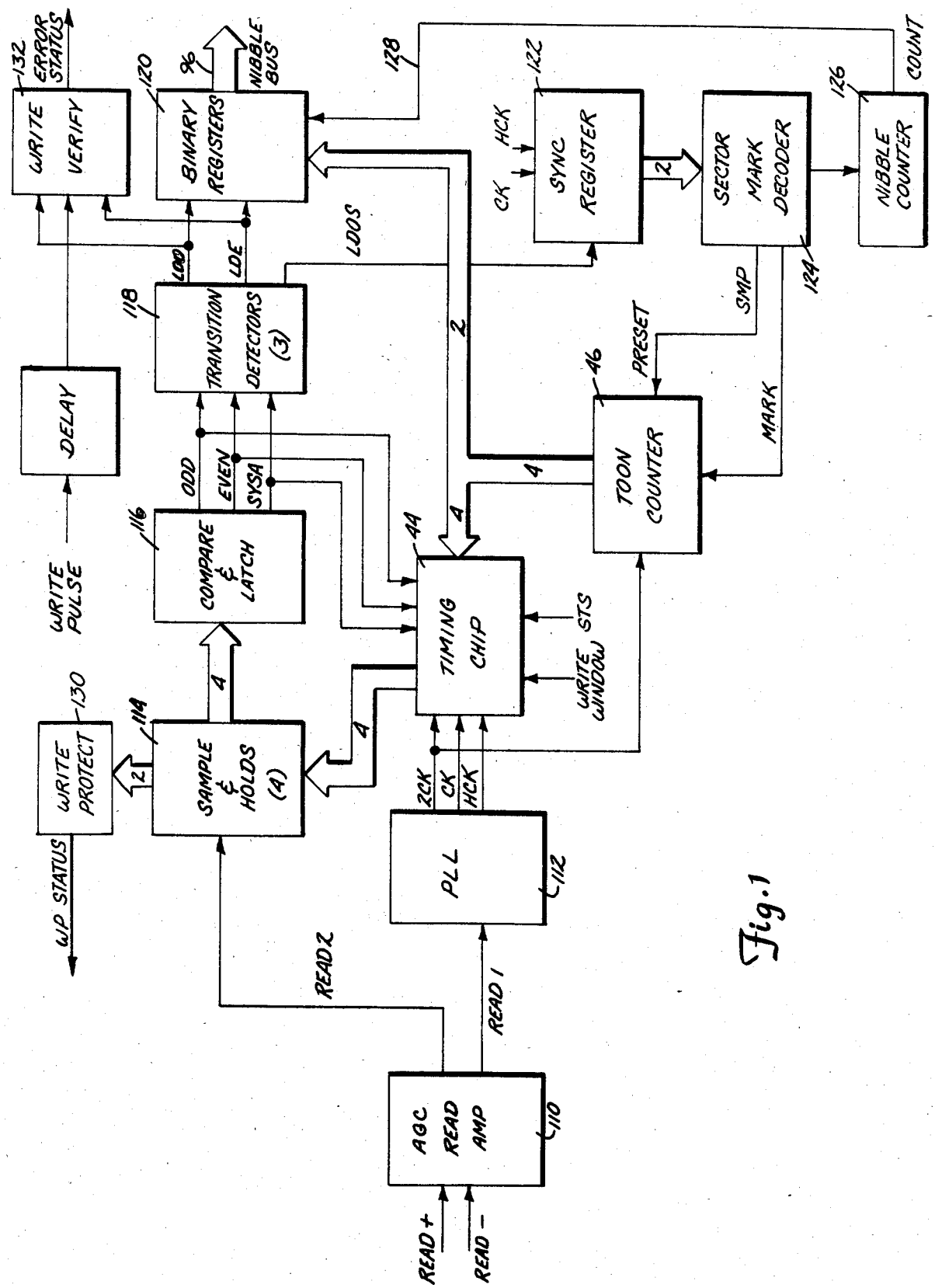
FIG. 1 shows a block diagram of the read channel of the optical recording system of the preferred embodiment.

FIG. 1 shows a block diagram of the read channel of the optical recording system according to the present invention. The pre-amplified signal from the read detector (not shown) is input to the AGC 110 shown in FIG. 1, which outputs the amplified and limited signal on Read 1 and Read 2 outputs. The Read 1 output is input to a phase lock loop 112 which tracks a prerecorded clock inscribed in the optical disk, or if the code is self-clocking, the clock information present in the code. The phase lock loop outputs several clock signals, the most important of which is a 2CK clock at a frequency twice that of the prerecorded clock. In the preferred embodiment, the rising edge of the 2CK clock is adjusted to occur slightly before the zero crossing of the prerecorded clock, the point at which the center of data holes are written. This 2CK is input to a Timing Chip 44 and to a TOON counter 46. TOON is the name of the fixed block code of the preferred embodiment. The TOON counter's essential purpose is to count the number of symbol positions to generate a symbol position address. The function of the Timing Chip 44 will be discussed infra.

The Read 2 signal is input to four gated sample and hold cells 114, two each for the respective even and odd symbol positions of the TOON code. The sampling of the cells is controlled by Timing Chip 44. The outputs of the two odd cells are input to a write protect circuit 130 and the output of all four of the cells are input to two comparators 116, and even and an odd comparator, respectively, which determine which of their two input sample and holds contains the highest hole associated signal power. The comparator outputs are first latched and then fed back to Timing Chip 44 and to a transition detector circuit 118. The transition detectors detect a change in the state of the comparators 116 outputs and signal that change to a pair of nibble registers 120, one for the even and one for the odd symbol positions. The address of the change as represented by the count on the TOON Counter 46 is recorded by binary registers 120 and becomes the binary value of the symbol. After two symbols have been recorded in the registers 120, the optical disk recorder reads the eight binary bits of data out of the registers along a data bus.

The system also detects the presence of sector marks and this information is supplied to a sync register 122 and a sector mark decoder 124 which decodes the location of sector marks, comprised of prerecorded marks having a distinctive format, and initializes TOON counter 46 and a nibble counter 126, which continues to count up by one each symbol until the next sector mark. There are, in the preferred embodiment, 32 such sector marks per revolution. The lowest order bit of this nibble counter, nibble count 0, is output on output 128 and is used by the binary registers 120 to decode two symbols into eight binary bits, one byte, of data to be output on bus 96.

The data of the present invention is written on the optical disk in fixed-block format wherein binary data is encoded into a symbol having a predetermined number of positions in which a predetermined number of holes are recorded. The preferred embodiment uses a so-called TOON code which has eight positions in which holes may be written and one position in which no holes are written. The latter position is normally reserved at the end of the symbol. The TOON code is further constrained to have one hole written at an even position and one hole written at an odd position. Only two holes are written in the symbol.

Figure 2:
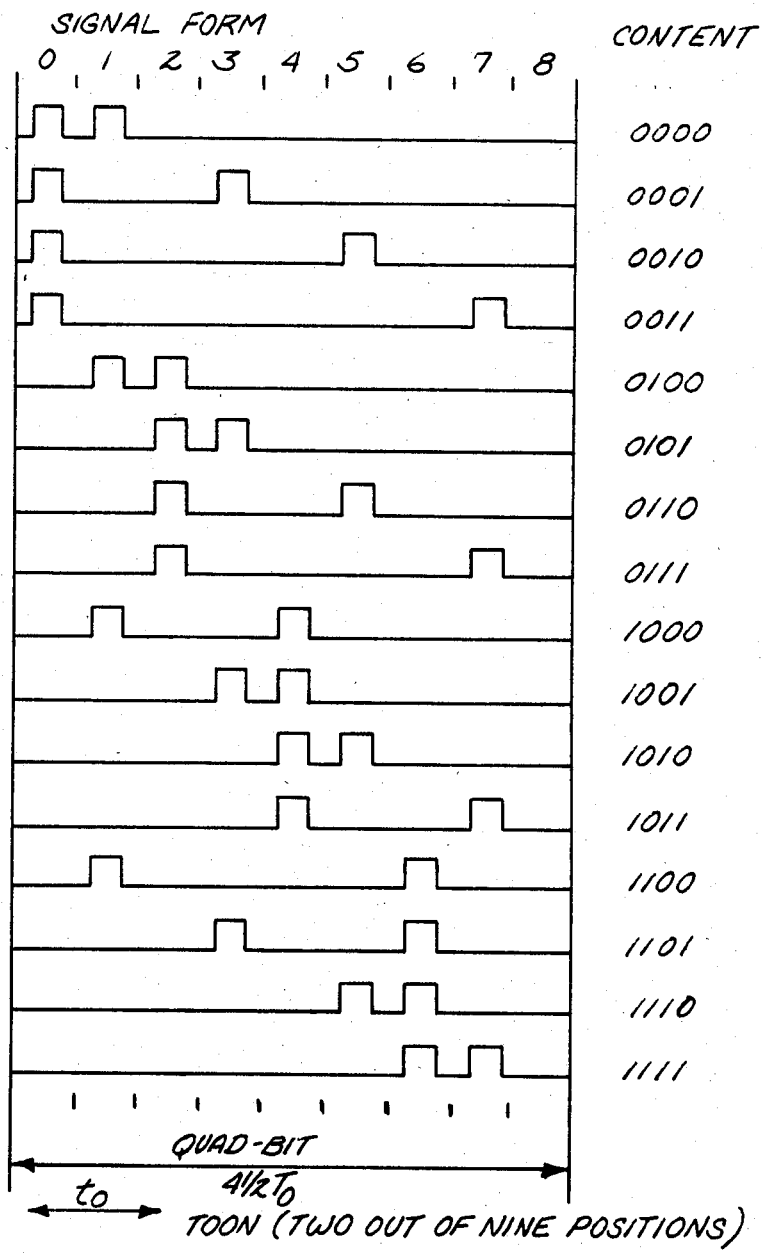
FIG. 2 shows the TOON code and it corresponding binary equivalent.

FIG. 2 shows the TOON code. It has nine positions numbered in the Figure from zero to eight. The eighth position is the one constrained to never have a hole recorded in it. The other eight positions have one hole in an even position and one hole in an odd position. The code is shown in the Figure and the corresponding binary bit values are shown in the table to the right. Each symbol of the TOON code encodes four bits of information.

Figure 3:
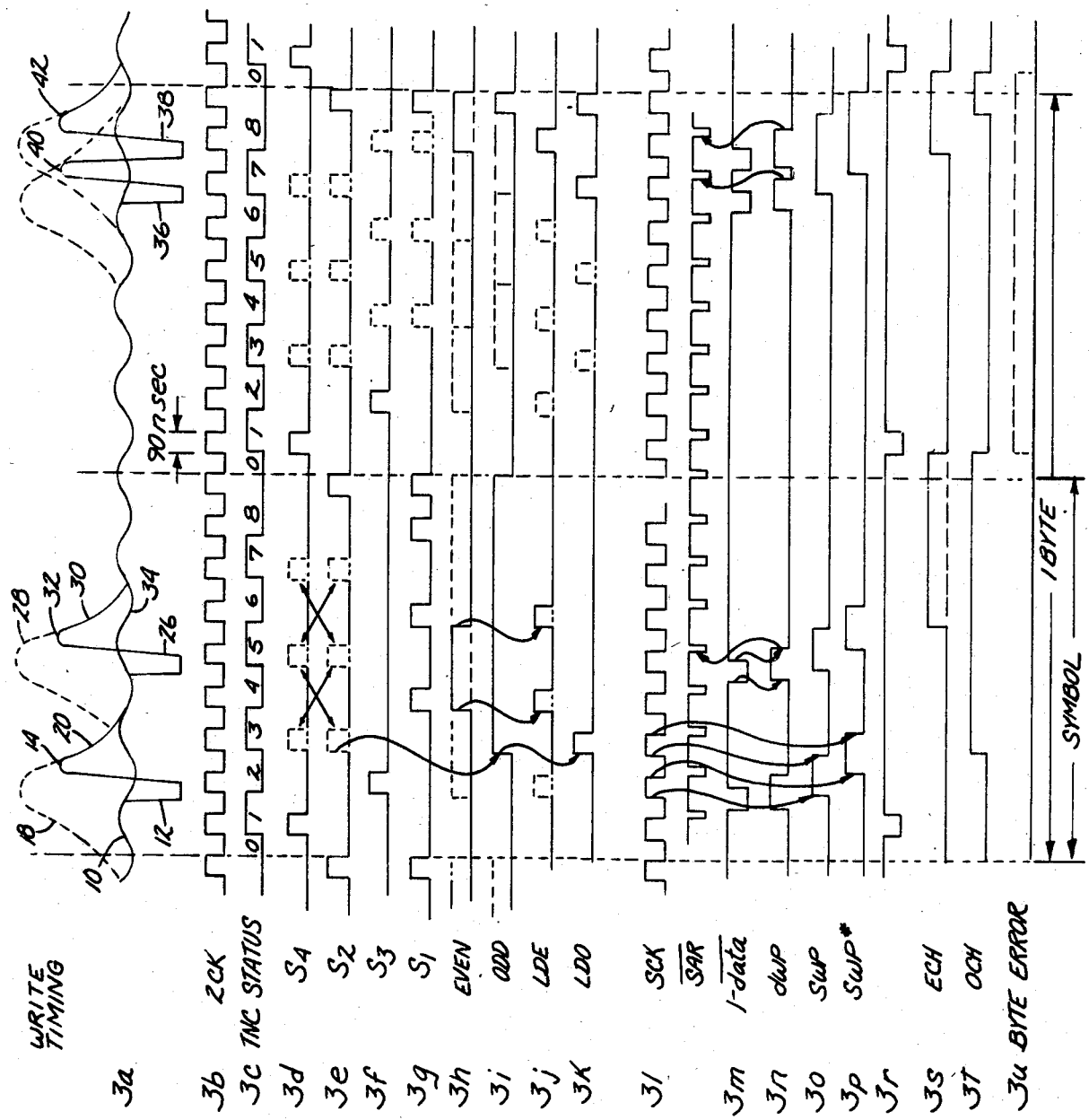
FIG. 3 shows a timing diagram of various signals and pulses of the apparatus of the present invention over two symbols and showing the signal levels associated with two possible hole patterns.

The code is recorded on the media in such a manner that four and one half clock periods, $T_o$, of the prerecorded clock 10, FIG. 3, span the symbol. The clock is illustrated as the sinusoidal line 10. It is from this signal that the phase lock loop generates the 2CK signal shown in FIG. 3b.

The fall of 2CK denotes the beginning of a symbol position and the rise of 2CK denotes approximately the center of a symbol position. There are nine 2CK clocks in a symbol.

FIG. 3c corresponds to the TNC0 bit out of the TOON Counter 46. It undergoes eight transitions during a symbol and the transitions occur at the center of a given symbol position. The numbers in the Figure correspond to the number of the symbol position in which the next transition occurs. There is no transition in ninth symbol position, number 8, primarily because no hole will ever be recognized in this position even if a hole is somehow recorded therein.

Holes are preferably written at the center of a symbol position. To write a hole, the optical recording device generates a write pulse from a laser beam of approximately 60 nanoseconds in length. The symbol position length or the length of time for a symbol position to pass past a fixed location at typical operating speeds of the optical recording system of the preferred embodiment is 180 nanoseconds. The hole burned into the optical recording medium by such a write pulse is typically much larger than 60 nanoseconds in length and may be larger than the 180 nanoseconds length of a symbol position. After the laser beam has been pulsed at write power the optical recording system of the preferred embodiment returns it to a read power level used conventionally to read the prerecorded clock on the optical recording surface. The laser beam continues to be focused for a short period of time on the hole just burned in the optical recording medium. The loss of reflectivity caused by the hole can be detected by the read detector employed in the read apparatus of a conventional optical disk recorder system.

FIG. 3a shows the inverse of the power of the reflected laser beam for two typical symbols on the optical recording medium. The drop in of reflection of the laser beam caused by the presence of a hole is shown as a positive signal, while the rise in reflection due to a write pulse is indicated by a negative signal. The vertical dashed lines in the Figure represent the boundaries at the edges of the symbols.

Again referring to FIG. 3a, the optical recording apparatus is shown writing a hole at the center of symbol positions numbers 1 and 4 of the first symbol. In this regard, the write pulse occurs 30 nanoseconds before the zero crossing of the prerecorded clock and is designed to reach its peak power precisely at the zero crossing of the prerecorded clock, at the center of symbol position number 1. Thirty nanoseconds later the write pulse is turned off. The write pulse in the Figure is denoted by the negative going waveform 12 and also by the 1-data NOT signal at FIG. 3m.

After the write pulse has been terminated and the laser beam restored to its "read" power the laser beam remains over a portion of the hole just formed in the optical recording medium, assuming, of course, a hole was in fact formed by the write pulse. In this regard, the hole itself does not reflect the laser beam as well and the inverse of the signal detected by apparatus detecting the reflected laser beam generates a high signal at 14 in the Figure. The solid line 20 in the Figure represents the actual signal, corresponding to the hole associated signal power. During a normal read where the apparatus reads the hole from edge to edge, the hole associated signal appears as in the dotted line 18 and peaks at a peak 16 which is of greater amplitude than peak 14 of the read after write signal 20. As can be seen by inspection of the Figure, the hole associated power 20 of a hole written at symbol position 1 is present to a significant degree at symbol position 2.

The second negative going pulse in FIG. 3a represents a second hole being written in the symbol at the center of symbol position 4. Here again, the dotted line 28 represents the hole associated signal power which would have been received by the read system were it to detect the hole under normal reading conditions. However, because the laser beam detects the hole at least 30 nanoseconds after the center of the hole has passed, the signal strength is again detected at a peak 32 somewhat less than it would have been under normal read conditions.

Assuming a defect in the media or perhaps a defect in the writing system, a hole may not formed in the media. When the write pulse is turned off, the hole associated power of the read signal does not follow line 30 but instead follows the line 34, which is the signal from the prerecorded clock.

The second symbol shows holes 40, 42 being written by write pulses 36 and 38 at symbol postions 6 and 7.

Figure 4:
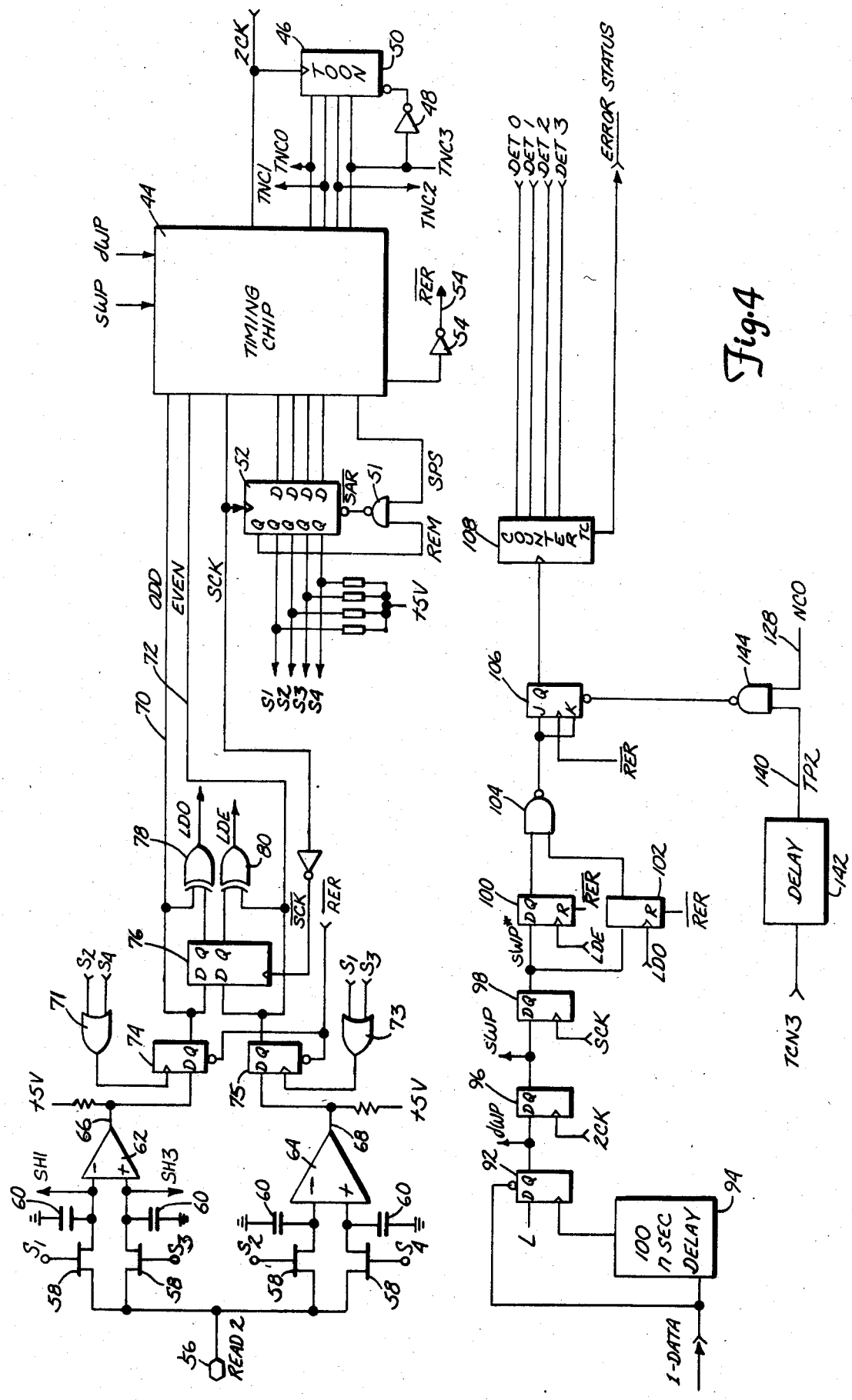
FIG. 4 shows a schematic of the the apparatus which detects by comparison the location of the odd and the even symbol positions having the highest hole associated signal levels and which compares the locations of the write pulse signals with the locations of the detected holes.

FIG. 4 shows apparatus first for detection of the location of the two holes of a symbol and secondly for comparing the location of the detected holes with the actual location of the write pulses.

Referring to the top right-most part of FIG. 4, the 2CK clock derived from the phase lock loop 116 is provided as an input to both a Timing Chip 44 and a TOON counter 46. TOON counter 46 counts once for each cycle of the 2CK with its four-bit count on outputs TNC0, TNC1, TNC2, and TNC3, respectively. A count of 8, TNC3, resets the counter to zero due to the inverter 48 feeding TNC3 back into master reset not 50 of the TOON counter 46.

Figure 5:
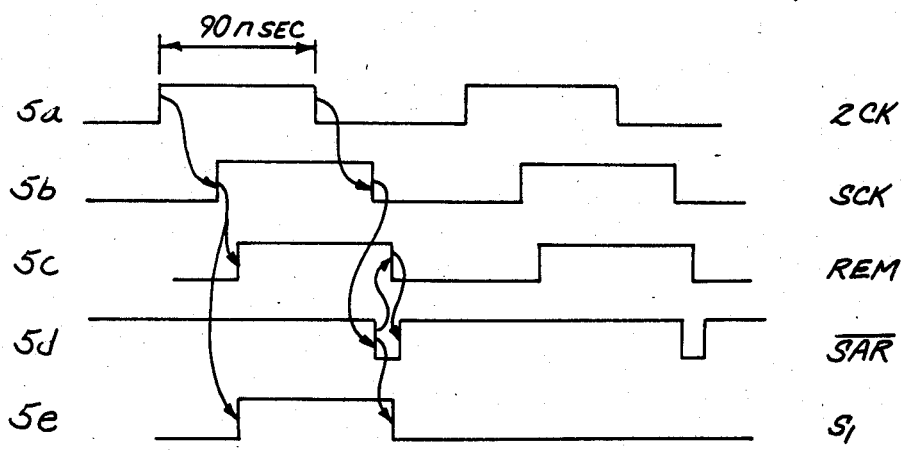
FIG. 5, consisting of a–e, shows the relative time spacing between a number of clocks and other symbols employed by the preferred apparatus.

As can be seen from FIG. 31, the Timing Chip outputs and S-clock ("SCK") which corresponds directly with the 2CK signal. SCK is delayed from 2CK by approximately 22.5 nanoseconds as can be seen from relative timing diagram FIG. 5. The Timing Chip 44 also outputs through register 52 signals S1, S2, S3 and S4 and an REM signal. Signals S1–S4 and REM are set by the rising edge of SCK clocking register 52. Signal SAR NOT resets register 52 and signals S1 through S4 and REM. SAR NOT is normally triggered at the falling edge of SCK, see FIG. 5 where it can be seen that at the fall of the SCK signal, which occurs 22.5 nanoseconds after the fall of the 2CK signal, causes the Timing Chip 44 to outputs an SPS signal connected to NAND gate 51, which, due to the presence of REM, causes SAR NOT to fall (see FIG. 5d). This resets register 52 and thereby resets signals S1 through S4 and REM as can be seen from FIGS. 5e and 5c. The resetting of REM in turn resets SAR NOT.

S1 is normally "on" for a period of approximately 90 nanoseconds from a point approximately 30 nanoseconds after the rise of the 2CK signal to approximately 30 nanoseconds after its fall. This corresponds to the center of a hole to approximately ninety nanoseconds after the center.

The Timing Chip 44 also outputs an RER signal, which is inverted by inverter 50, to become an RER NOT signal 54. RER is output once per symbol during the last half period of symbol position 0 at the rise of SCK. The purpose of RER is to signal the end of a symbol to various registers as will be discussed infra, and also resets other registers.

Referring to the upper left-most of FIG. 4, the signals S1 to S4 control corresponding FET gates between the Read 2 input 56 and respective grounded capacitors 60. The combination of the gates and capacitors forms sample and hold cells. The respective sample and hold cells will henceforth be referred to by the respective signals controlling their gates, S1, S2, S3 and S4. The signal input on Read 2 line 56 corresponds to the hole associated power of the reflected laser beam as discussed above. The outputs of two of the sample and hold cells, SH1 and SH3, are provided as inputs to the write protect apparatus to be discussed infra. Each of the capacitors 60 is also connected two each to respective comparators 62 and 64. Comparator 62 compares the signal value on the S1 sample hold with the signal value then present on the S3 sample and hold, while the comparator 64 compares the signal value in the S2 sample hold with signal value on the S4 sample and hold. The comparators output the results of the comparison on outputs 66 and 68, respectively. These outputs are latched by flip flops 74 and 75, the outputs of which are provided as respective inputs 70 and 72 to the Timing Chip 44.

The write beam is synchronized to write for 60 nanoseconds centered on the zero crossing of the prerecorded clock, the center of a symbol position. In the absence of a write signal, S1 through S4 go high at the center of a symbol position and normally terminate ninety nanoseconds later at the boundary of the symbol position. However, when a write pulse has just occurred, Timing Chip 44 synchronizes their reset by coordination with write pulse. It issues the SPS signal, which causes NAND gate 51 to issue the SAR NOT signal, which in turn resets register 52 and S1 through S4, in response to sWP and dWP signals. These two signals, sWP and dWP, are the outputs of registers 96 and 98, which will be discussed in more detail infra, but their function is essentially to generate a delay signal responsive to the write pulse. The purpose of this delay is to delay the turning off of the signals S1 through S4 until the peak of the hole associated signal has been sampled. This generally occurs a measureable time after the occurrence of the write pulse, and will be a predetermined time. Signals sWP and dWP are provided as inputs to Timing Chip 44. Their timing in relation to a write pulse are shown in FIGS. 3m through 3o. The write pulse corresponds to the 1-data NOT signal, FIG. 3m.

Referring again to FIG. 4, the Timing Chip 44 initially turns S1 and S2 on during the last half-period of symbol position 8 of every symbol position, see FIGS. 3e and 3f. Because symbol 8 is the symbol in which no hole is ever written, this sampling is intended to initialize these sample and hold cells to a reference value. An alternative method of initialization would be to include circuitry to initialize these sample and holds from a fixed reference equivalent to the signal strength of the no-hole condition.

During the first symbol position of the immediately following symbol, symbol position 0, and even position, sample and hold cell S4 is turned on to sample the signal at the first even cell. During the first odd position, position number 1, sample and hold S3 is turned on to sample the signal at the first odd cell. The signals present on the Read 2 line 56 during these symbol positions are copied into the corresponding capacitors 60 of the sample and hold cells and compared with the signal in the S1 and S2 sample and hold cells, which contain the reference level. If for example, the results of the comparison indicate that S1 sample and hold value exceeds the S3 sample and hold value, the output 66 of the comparator 62 is low. Output 68 is low if S2 exceeds S4. The Timing Chip 44 then saves the higher of the two values, S1 (S2). It does this at the next occurrence of an odd (or even) cell by triggering the S3 (S4) sample and hold, which then holds the lowest-valued signal of the two. If again the S1 (S2) sample and hold contains the highest value, at the next occurrence of an odd (even) symbol position, the S3 (S4) sample and hold is again triggered. This process continues throughout the symbol with the highest valued sample and hold cell retained and compared with the next sampled value. At the end of the symbol, one of the sample and holds of each comparator contains the highest valued signal, and this signal was generated by the hole within the symbol, if there is a hole recorded there.

Referring to the example shown in FIG. 3a, when the S3 sample and hold cell is triggered at position 1 in the first symbol, it samples the signal caused by the hole just written. The sample and hold samples a read signal at approximately the level indicated at point 14 on FIG. 3a. As can be seen by inspection of FIG. 3a, the signal level at this point 14 is higher than the signal sampled by the S1 sample and hold at the previous symbol position 8. The signal in the S3 sample and hold is higher than the signal on the S1 sample and hold and is retained. At the next occurrence of an odd symbol at symbol position 5, the Timing Chip 44 determines that S3 now contains the highest signal and triggers the S1 sample and hold. By inspection of FIG. 3a, it can be seen that the signal level at this point 30 is higher than the reference signal level but lower than the peak value 14 of the signal at position 1. Thus, S3 continues to contain the higher of the two values. Timing Chip 44 triggers S1 at the last odd position, position number 7. This value is again less than the value in sample and hold cell S3. (The sequence of triggering of S1 and S3 just described is shown at FIGS. 3f and 3g.)

If at any time the two signal levels present in the respective sample and holds are about equal, which may occur when the holes are recorded later in the symbol, the state of the comparators 62 or 64 is indeterminate. Either one of the two is retained for the next symbol. This feature is illustrated by the dashed lines shown in FIGS. 3d and 3e which show the triggering of the S2 and S4 sample and hold cells.

Timing Chip 44 recognizes the finding of a new higher valued signal by the change in the outputs of the latched comparators 62 or 64, which are connected to Timing Chip 44 via flip flops 74 and 75 on lines 70 and 72. FIGS. 3h and 3i show the state of the outputs of the even and odd flip flops 74 and 75, respectively.

The outputs of the comparators 62 and 64 are provided as inputs to respective registers 74 and 75, whose outputs are in turn provided to register 76 and as one input to respective exclusive-OR gates 78 and 80. The respective outputs of register 76 are provided as the other respective inputs to exclusive-OR gates 78 and 80.

Registers 74 and 75 are clocked by OR gates 71 and 73 respectively, which form the logical OR of the signals S2 and S4, and S1 and S3 respectively. This method of clocking these registers assures that the outputs of the respective comparators are sampled after the comparators have changed by sampling an even position at the next odd position and an odd position at the next even position. Further the state of the flip flops remains steady for a predetermined clock period. Register 76 is clocked by the inversion of SCK approximately 90 nanoseconds after the clocking of register 74. The exclusive-OR gates 78 and 80 compare the outputs of the respective comparators 62 and 64 from one symbol position to another and generate a pulse of approximately 90 nanoseconds duration if the outputs change. FIG. 3j shows a load odd signal, LDO, out of exclusive-OR gate 78 indicative of the changes in the relative signal levels in the S1 and S3 sample and holds discussed heretofore. FIG. 3k shows a load even signal, LDE, out of exclusive-OR gate 80 indicative of the changes in the relative signal level of sample and hold cells S2 and S4 discussed above. The load odd and load even pulses LDO and LDE occur when a new "higher" signal level has been recognized by the respective comparators.

A 1-data NOT signal corresponds to a write pulse issued by the optical recording system. It is provided as an input to the SET NOT input of a flip flop 92 and also to variable delay circuit 94. The delay of the circuit 94 is adjustable to a maximum delay of 100 nanoseconds so that the circuits of the preferred embodiment can be fine tuned to a particular machine. The delay not only adjusts the setting of the turn-off time of S1 through S4, but also the timing in relation to the LDO and LDE signals. An 1-data NOT pulse sets flip flop 92 and a pulse from the 100 nanosecond variable delay circuit 94 resets the flip flop 92 as the D input is latched low. The output of this flip flop is the dWP signal shown in FIG. 3n and is provided both to Timing Chip 44 and to a flip flop 96. Flip flop 96 is clocked by the 2CK signal so that the rising edge of 2CK sets the flip flop and the next rising edge resets it. The output of this flip flop 96 is the sWP signal shown in FIG. 2o and is provided to both Timing Chip 44 and to a flip flop 98. Flip flop 98 is clocked by the inverted SCK clock such that the fall of SCK set the flip flop and the next fall resets it. The signal out of this flip flop is the sWP* signal shown at FIG. 3p. From inspection of the Figure, it can be seen that sWP* is delayed about 120 nanoseconds from sWP. The output of this flip flop 98 is provided as an input to flip flops 100 and 102. These are clocked respectively by the LDE and the LDO signals. The delays of the 100 nanosecond delay 94 and flip flops 96 and 98 delay the write pulse from reaching flip flops 100 and 102 until a time corresponding to the "90" nanosecond sampling time of S1 through S4 signals, the delays through the comparator 62, delays through the flip flops 74 and 75 and register 76, and the delays through exclusive OR gates 78 and 80.

If a hole has been properly written in the optical recording surface, a write pulse will be present at the D input to flip flop 100 at the occurrence of the last load even and load odd pulses, LDE and LDO respectively. If, and only if, there is a correspondence between the last occurrence of the LDE and LDO signals and write pulses will the outputs of the flip flops 100 and 102 be simultaneously at a logical one state. The output of flip flop 100 is shown at FIG. 3s and the output of flip flop 102 is show at FIG. 3*t*. In the example, if the second write pulse of the first symbol did not write a hole correctly or if a media defect caused a high level at another even position, flip flop 100 remains off. This is shown in FIG. 3*s* by the dashed lines. This same analysis pertains to the LDO signal and flip flop 102.

The outputs of these flip flops 100 and 102 are input to a NAND gate 104. The output of NAND gate 104 is low if, and only if, flip flops 100 and 102 have recorded the simultaneous occurrence of write pulses and load even and load odd signals.

A nibble count 0 (128) issued by the nibble counter 126 and a TP2 pulse 140, which comprises a delayed TNC3 pulse from delay 142, are inputs to a NAND gate 144, the output of which resets a JK flip flop 106. Nibble count 0 occurs every other symbol, and TP2 occurs at symbol position count 2. After the end of a symbol, the Timing Chip 44 outputs an RER NOT signal which clocks JK flip flop 106. The RER NOT signal is shown at FIG. 3*r*. If the state of the inputs to the JK input are zero, the Q output of the JK flip flop 106 remains unchanged. Thus, during the time of two symbols comprising a byte of data with correctly written holes, the output of the flip flop 106 remains zero. However, if either one of the two symbols between the resetting of the flip flop is incorrectly written, a one is present at the inputs of the flip flop 106. This causes the Q output to change to a one and remain in that state. The state of the output of the JK flip flop is shown in FIG. 3*u*. If the first symbol had a error, the flip flop has a high output at the occurrence of RER NOT at symbol position 0 of the second symbol as indicated by the dashed lines in the Figure.

In either case, the output of flip flop 106 is provided to a count input of counter 108. Counter 108 is initialized to a predetermined count by inputs DET0 to DET3. The count can be varied to tolerate a certain level of errors. A clock input decrements the counter 108. At a count of zero, counter 108 outputs on the TC output an error status indicating that the error tolerance has been exceeded.

The reason that the flip flop 106 is adapted to indicate the presence of an error in either one of two symbols is because the preferred optical coding system operates on bytes of 8 bits. Each symbol of a TOON code encodes 4 binary bits of data. Thus two symbols encode 8 bits of data.

In the preferred optical recording system, the first byte of every block of data is the write protect byte and comprises a hex 66. In a sector of data in the preferred system, there are three blocks of data: the first block is a vector address block, the second is a user data block, and the third is a post field block. The write protect byte of data is recorded in the first two symbols of these blocks.

Figure 6:
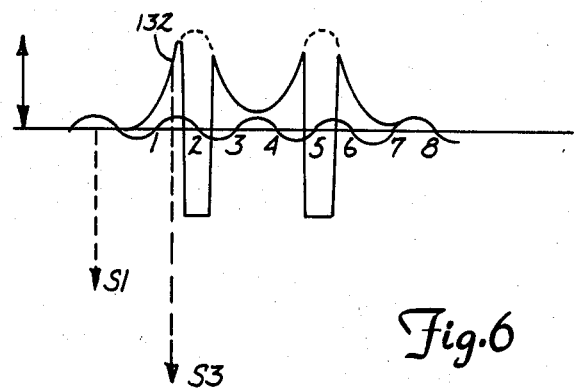
FIG. 6 shows the signal pattern received from a previously recorded write protect symbol during writing of a second write protect symbol.

The two symbols each have the same pattern: holes are recorded in positions 2 and 5. The signal pattern one receives in attempting to overwrite a prerecorded write protect byte is shown by the solid lines in FIG. 6. The dotted lines show the peak values of the hole associated power of the read signal were the symbol read under normal reading condition. The strong negative going pulses centered on positions 2 and 5 represent write pulses rewriting holes at these positions.

The vertical dashed lines in the Figure show the positions in which the S1 and the S3 sample and holds are triggered during write verify. The S1 sample and hold samples a signal at the peak of the prerecorded clock. (It could also have sampled the signal at the negative peak because positive and negative peaks alternate at position 8 of adjacent symbols.) The S3 sample and hold samples its signal at the last half of position one. At this point, indicated by the intersection 132 of the second vertical dotted line with the solid line, the hole associated power of the signal from the hole at position number 2 is present to a significant degree. In the preferred optical recording system, the total signal excursion of the hole associated power from zero to a positive peak is approximately 500 millivolts. From the example shown, it is apparent that the signal present in the S3 sample and hold exceeds the signal present in the S1 sample and hold by a margin well exceeding 100 millivolts.

Figure 7:
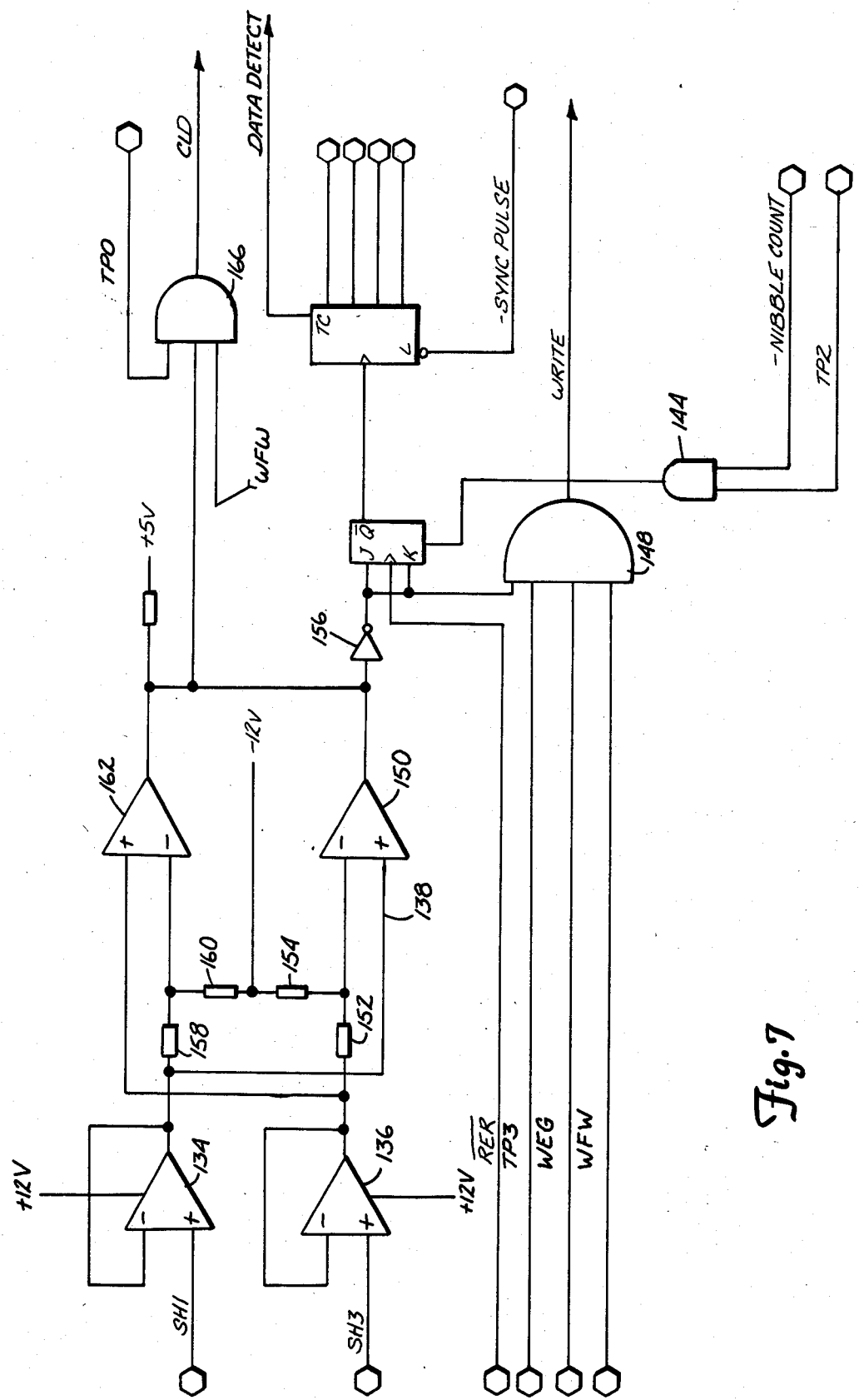
FIG. 7 shows a schematic of the write protect data detection apparatus of the present invention.

As heretofore mentioned, the S1 and S3 sample and hold cells are output to a write protect circuit 130, which is shown in more detail at FIG. 7. These two outputs, SH1 and SH3 respectively, are first buffered by buffer amplifiers 134 and 136 so as not to drain the charge from the capacitors 60 of the sample and hold cells. The output of the SH1 buffer amplifier 134 is provided as the input to the positive terminal of a comparator 150. The output of the SH3 buffer amplifier is connected to a 40 ohm resister 152 which is in turn connected through a 4.6k resistor 154 to a −12 v supply. This causes an approximately 100 millivolt drop across the 40 ohm resistor. This drop remains approximately 100 millivolts within the range of values of the output of buffer amplifier 136, i.e., between 0 and 500 millivolts.

The 40 ohm resistor 152 is also connected to the negative input of the lower comparator 150. The output of this lower comparator goes low when the value of S3 sample and hold cell exceeds the value of the S1 sample and hold cell by the value of the drop across the 40 ohm resistor 152, 100 millivolts. If it does after position one the first symbol of a data block, data has been previously recorded in the block. The output of the lower comparator 150 is inverted by inverter 156 and provided as one input to AND gate 158. The other inputs to this gate are signals WFW, which is high at every first byte of a data block, WEG, which is high at during the block to be written, and TP3, which is an the output of delay 142, see FIG. 8, and which occurs at TOON position 3 of a symbol. At the occurence of all three of these signals and a high signal from inverter 156, the AND gate 148 output goes high. This high output comprises a Write Protect Status signal, which the optical system responds to by terminating writing.

The apparatus just described also functions as a data detector by the addition of a second comparator 162 and resisters 158 and 160. The output of buffer amplifier 136 is connected to the positive input to comparator 162. The output of buffer amplifier 134 is connected through 40 ohm resister 158 to the negative terminal of comparator 162. The 40 ohm resistor is also connected across 4.6k ohm resister 160 to the −12 volt supply, giving the same 100 millivolt drop across the resister 158 as was found with the other 40 ohm resister 152.

The comparator so connected goes low when the output of buffer amplifier 134 exceeds the output of buffer amplifier 136 by more than the drop across resister 158, 100 millivolts. This occurs when sample and hold S1 exceeds sample and hold S2 by 100 millivolts or more.

From the above we see that comparator 162 goes low when SH1 exceeds SH3 by 100 mv and comparator 152 goes low when SH3 exceeds SH1 by 100 mv. The outputs of both comparators are wired together and provided as inputs to inverter 156. Thus the output of the inverter goes high when either of the comparators indicates that the voltage level in one of the sample and holds exceeds the other by 100 millivolts. One sample and holds will exceed the other by such a margin if there is a hole recorded in the media, at either an odd or an even position, or if there is a defect in the media causing a drop in reflection.

The output of the inverter 156 is provided to both the J and the K inputs of JK flip flop 164. This flip flop is reset every other symbol by the occurence of—nibble count 0 from nibble counter 126 and TP2 from delay 142, which are input to NAND gate 144, the output of which is connected to the RESET NOT input of the JK flip flop 164. The flip flop is set by a high input on its J and K inputs, which occurs if the comparators 150 and 162 indicate the presence of a hole or a defect, and a clock of RER NOT, which is issued each position zero of a symbol. The Q NOT output of the flip flop 164 is high after reset and goes low if there is a hole or a defect in either of the two symbols before the next reset. If it is low at the next reset, Q NOT goes high. Else it remains high. A transition from low to high clocks counter 168 to which the Q NOT output is connected.

The count of counter 168 is loaded via DET0, DET1, DET2 and DET3 inputs from the optical system. At each clock of the counter, the counter decrements by one. On reaching its terminal count, the counter outputs on its TC output a signal indicative of the presence of data or defects. The count in the counter 168 can be adjusted to tolerate a certain level of noise or defects, the particular tolerance level chosen being a design choice in view of the error correction chosen.

The output of the comparators 162 and 150 are also connected to an AND gate 166. The other inputs to this gate are TP0 from delay 142 and the WFW signal, which is on during the first byte of a block of data. The concurrence of these signals indicates the lack of data at the write protect byte of the data block. The signal is provided to the system as an alternate method for checking whether data has been recorded in a block of a sector.

Figure 8:
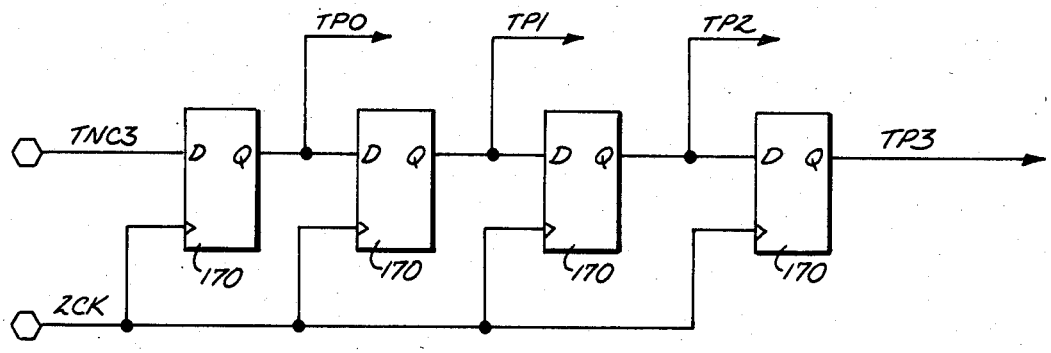
FIG. 8 shows a schematic of the apparatus which gives a clock pulse at specified positions of TOON symbol.

Delay 142 is shown in FIG. 8. The TNC3 output from TOON counter 46 is input to the first of a series of interconnected flip flops 170. TNC3 is high during count 8 of the TOON counter and is low at all other counts. Each of the flip flops is clocked by 2CK. Thus the outputs of successive flip flops go high in response to a high TNC3 signal at successive TOON symbol positions, i.e., at TP0, TP1, TP2, TP3, etc. These outputs are used by various apparatus of the present invention as above-described.

The enumeration of the elements of the preferred embodiment are not to be taken as a limitation on the scope of the appended claims, in which we claim:

1. Apparatus for using differential data detection in write protection of an optical recording apparatus, comprising
 a write protect byte of data recorded as the initial byte of every data block, said byte having a hole recorded at a predetermined position relative to a reference position;
 read means for reading data from an optical recording surface immediately prior to writing data on the surface;
 a pair of sample and hold cells responsive to read signals from said read means;
 means for triggering a first of said sample and hold cells at said reference position;
 means for triggering a second of said sample and hold cells at the position just prior to said predetermined position;
 first comparator means for comparing the first sample and hold cell value with the second sample and hold cell value and for generating a comparator output when the latter exceeds the former by a predetermined amount;
 means responsive the comparator output of said comparator means for terminating writing in the block when the optical system is writing a write protect byte of data.

2. The data detection and write protection apparatus of claim 1 wherein each of said means for triggering a sample and hold cell includes timing means for triggering the sample and hold cell during the second half of a position.

3. The data detection and write protection apparatus of claim 1 further including
 second comparator means for comparing the first sample and hold cell value with the second sample and hold cell value and for generating a second comparator output when the former exceeds the latter by a predetermined amount;
 level detect means responsive to either of said outputs for generating a signal indicative of the presence of data or a media defect bytes in the optical recording surface; and 4. The data detection and write protection apparatus of claim 1 further including
 means responsive to the lack of both of said outputs for generating a signal indicative of the absence of data or a media defect in the optical recording surface.

5. The data detection and write protection apparatus of claim 1 further including
 counter means responsive to said level detect means for generating a data detect signal when a predetermined number of said data or media defect bytes have occurred.

6. Apparatus for using differential data detection in write protection of an optical recording apparatus, comprising
 a write protect byte of data recorded as the initial byte of every data block, said byte having a hole recorded at a predetermined position relative to a reference position;
 read means for reading data from an optical recording surface immediately prior to writing data on the surface;
 a sample and hold cell responsive to read signals from said read means;
 means for triggering said sample and hold cell at the position just prior to said predetermined position;
 first comparator means for comparing the sample and hold cell value with a reference value and for generating a comparator output when the former exceeds the latter by a predetermined amount;
 means responsive the comparator output of said comparator means for terminating writing in the block when the optical system is writing a write protect byte of data.

7. The data detection and write protection apparatus of claim 6 wherein said means for triggering the sample and hold cell includes timing means for triggering the sample and hold cell during the second half of a position.

* * * * *